United States Patent
Meacham et al.

[11] Patent Number: 5,609,110
[45] Date of Patent: Mar. 11, 1997

[54] 2D AND 3D PILOT-CHANNEL ARRAYS

[76] Inventors: Patrick E. Meacham, 20298 Hunter Ct., Lakeville, Minn. 55044; Michael S. Zeilinger, 8916 72nd St., Cottage Grove, Minn. 55106; Clifford B. Meacham, 8730 E. 195th St., Prior Lake, Minn. 55372; M. Conrad Huffstutler, Jr., 280 Cole Dr., Liberty Hill, Tex. 78642

[21] Appl. No.: 343,142

[22] Filed: Nov. 21, 1994

Related U.S. Application Data

[63] Continuation-in-part of Ser. No. 134,709, Oct. 12, 1993.

[51] Int. Cl.$^6$ .................................................. B61D 49/00
[52] U.S. Cl. .......................... 105/355; 104/137; 410/1; 410/54
[58] Field of Search .................................. 104/134, 135, 104/137; 105/355, 373, 392, 422, 423, 455, 462, 463.1, 457; 414/537, 538; 196/182, 41; 238/10 R; 410/1, 54, 2, 52, 92, 93, 156

[56] References Cited

U.S. PATENT DOCUMENTS

| | | | |
|---|---|---|---|
| 2,355,867 | 8/1944 | Jarvis | 414/537 |
| 2,625,118 | 1/1953 | Lechner | 105/422 |
| 2,952,341 | 9/1960 | Weiler | 105/422 |
| 3,025,985 | 3/1962 | Crawford | 414/537 |
| 3,027,580 | 4/1962 | Haack | 414/537 |
| 3,232,242 | 1/1966 | Krueger | 410/1 |
| 3,687,314 | 8/1972 | Haugland | 414/537 |
| 3,757,972 | 9/1973 | Martin | 414/537 |
| 4,008,669 | 2/1977 | Sumrell | 105/422 |
| 4,091,743 | 5/1978 | Lemon | 105/422 |
| 4,109,809 | 8/1978 | Clark | 410/1 |
| 4,127,900 | 11/1978 | Melley et al. | 296/182 |
| 4,861,095 | 8/1989 | Zajic | 296/182 |
| 5,140,716 | 8/1992 | Rawdon et al. | 414/537 |
| 5,249,910 | 10/1993 | Ball | 414/538 |

FOREIGN PATENT DOCUMENTS

| | | | |
|---|---|---|---|
| 0508440 | 12/1954 | Canada | 296/182 |
| 1507636 | 9/1989 | U.S.S.R. | 296/182 |

*Primary Examiner*—Mark T. Le

[57] ABSTRACT

Pilot-channel apparatus is provided for guiding movements of runnered vehicles, equipment fitted with skid runners and containers with runners for three-dimensional displacements such as loading and transport on/off wheeled trailers and for two-dimensional displacements such as movements within a planar storage area. Unitary and multiple pilot channels incorporate characteristic forms with specified features for safe, reliable engagement with known runner profiles to control lateral and transverse powered movements, especially loading of snowmobiles onto a trailer. Pilot-channel apparatus is supplied in the form of formed shapes and bands of length up to approx. 10 meters which allows customized placement, mounting and spacing of specific pairs of fixed or moveable channels. Specific two- and three- dimensional pilot-channel arrays and kits with specific shapes of pilot channels are indicated for owner- installation on existing snowmobile trailers. Special all-purpose channel arrays adapted to engage a broad range of known runner profiles on snowmobiles can be factory installed on new trailer frames with attendant savings in trailer cost and weight.

4 Claims, 14 Drawing Sheets

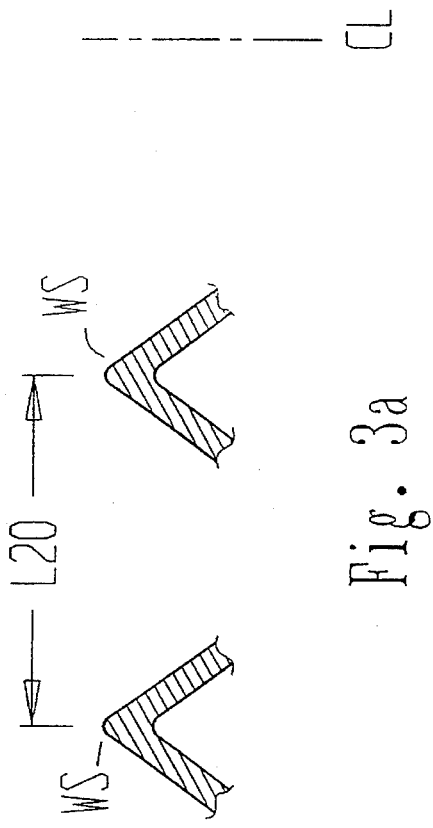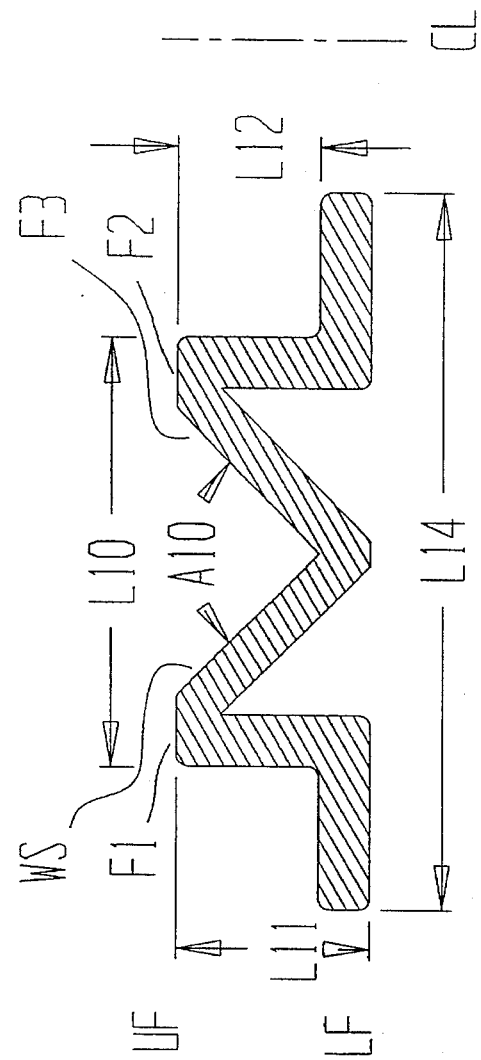

2D AND 3D PILOT-CHANNEL ARRAYS

RELATED APPLICATION

This application is a Continuation-In-Part of U.S. application Ser. No. 08/134709 filed 12 Oct. 1993, Inventor- P. E. Meacham et al.

BACKGROUND

This invention relates to two-dimensional, 2D, and three-dimensional, 3D, arrays of pilot channels for the support and guidance of vehicles and containers which are moveable on elongated runners.

Snowmobiles used in long-distance competition have been fitted with sharp-edged, wear-resistant carbide blade inserts for several years. These rail-like elements permit the machine to travel over extended patches of frozen sand/gravel without wearing off the sharp edge which is a significant benefit for directional control in high-speed turns. However, the sharp ends and edges of these elements "dig" into a typical wood trailer deck during sliding movements to load the sled. Provided enough brute force is available to force the sled, the usual loading/unloading process produces deep gouges in the trailer floor and reduces its life to a few uses. An alternative solution is to lift the machine with a hoist mounted on another vehicle. The pilot-channels and arrays of this invention have been developed after careful study of the profiles of skis and carbide blades and the safety factors related to driving one or more sleds directly into a secure position on the trailer.

No patents or publications can be found which disclose: (a) pilot channels specifically shaped to engage only the upper-working-edge surfaces of snowmobile skis or (b) 2D or 3D pilot-channel arrays for guiding and supporting runner-supported vehicles such as snowmobiles.

SUMMARY OF THE INVENTION

This invention consists of pilot channels having a unique form for engaging the working surfaces and edges of load bearing runners and pilot-channel arrays which can be formed by positioning pilot-channel segments.

The basic goal of this invention is further to provide pilot channels and pilot-channel arrays, either two dimensional (2D) or three dimensional (3D), which guide and support the runners of a vehicle or container during movements for loading and unloading. Since pilot channels engage the runners even when the sled is not moving forward, they provide lateral support for the sled during transport. In the context of this invention, 2D denotes an array for guiding movements which fall approximately on one plane; 3D denotes an array for guiding movements within a three-dimensional space. Movements along the floor of a single-level showroom would be 2D; loading and unloading from a trailer, which involve movement along inclined planes from one level to another would be 3D. In the case of snowmobiles with a rear drive track and a pair of front steering runners fitted with carbide blade elements, the pilot channels of this invention have a runner-profile contacting shape which supports and guides each runner from its working faces and has a central recess which does not contact the wear-resistant carbide element. Because the size, spacing and shape of snowmobile runners and carbide blade attachments is highly variable, it is contemplated that several scaled versions and sizes of pilot channels must be provided to meet the needs of the marketplace. Because pilot channels and arrays of this invention tolerate contacts with the wear-resistant elements during forward or backward movement, they are a valuable addition to the list of snowmobile necessities.

Another goal of this invention is to provide kits of pilot-channel segments or sections which can be attached by a hobbyist to an existing snowmobile trailer to create unique 2D and 3D pilot channel arrays. Care and attention have been given to selection of pilot-channel materials which are strong, durable, and able to be formed directly to the final shape. For many shapes, recycled polymers can be used for preparation of formed pilot channel sections with attendant cost savings and environmental benefits.

Another goal of this invention is to provide multiple pilot-channels within a single formed strip 100–800 mm wide. Such strips can be applied at a predetermined spacing to conventional wood or metal trailer decking during the original manufacturing operations. For this case, the spacing distance would be selected to fit the standard track of popular snowmobiles.

Still another goal of this invention is to provide a modular decking system consisting of multiple pilot channels to replace conventional lumber, plywood or sheet metal for snowmobile trailer decking. Such a deck can be assembled from 2–6 wide, interlocking strips or formed as a single piece by known plastic fabrication methods. For this embodiment, the deck surface would include a pattern of spaced parallel pilot-channel features for engaging the runner working edges of one or more popular snowmobiles.

A further goal of this invention is to provide a system of 2D pilot channels to guide machines equipped with carbide-bladed runners in various types of office movements, i.e., sales rooms, repair shops, off-season storage halls, etc. For example, moving a snowmobile around the floor of a showroom or repair shop under its own power. Such a system would include pairs of pilot channels secured to a set of moveable sheets which can be positioned independently to guide the sled along a desired 2D path inside a building.

The pilot channels of this invention are shaped to mate with selected working faces of runners used on sledges, pallets, stacked containers, snowmobiles, trail-grooming equiment, etc. The basic function of the pilot-channel arrays of this invention is to guide runnered vehicles and containers for secure, compact storage when moved slowly under power. Certain sharp-edged carbide blade elements of vehicles designed for operation on ice or frozen turf are extremely destructive of the surfaces of transport trailers. Pilot-channels of this invention are designed to lift the wear-resistant elements above the baseplane and to engage other non-carbide faces and edges of the runner to allow easy, controlled sliding movements under directional control. Pilot-channel arrays are prepared by fastening channel segments of selected lengths at a predetermined spacing to a baseplane structure.

An alternative 2D array of pilot channels would be for "drive-in, drive-out" storage of snowmobiles on the floor of a display hall which would utilize sets of inter-related baseplanes each with a straight, curved or angled switching guide segment, combined into an assembly to direct the machines from the main aisle to a desired side branch.

Another alternative 2D array of pilot channels would be for the movement of stacked containers or pallets inside a semitrailer. A further alternative 2D array of pilot channels could be used for the movement of heavy equipment fitted with special skids within a factory as is common by millwrights.

Still other alternative 2D pilot channel arrays can prepared by providing for one or more changeable baseplane zones. Moving or articulated segments of a pilot-channel array can be: (a) pivotable about a fixed axis, (b) short lengths fixed to a set of slideable baseplane strips or (c) deflectable elongated sections free to move on the baseplane whose position is controlled by sliding elements below the baseplane.

An alternative 3D array of pilot channels would be a trailer for transporting snowmobiles with two runners; in this case there could be three sections or baseplanes, i.e., the working deck surface of a trailer, one or more pivoting "on-loading" ramps, and one or more pivoting or "off-loading" ramps, none of which are coplanar in use. For loading, each machine reaches the deck level by driving up on the loading ramp and into a storage location on the deck surface. For unloading, the sled is then driven off one of the unloading ramps.

The benefit of pilot channels is that expensive machines can be safely loaded into a closely-spaced group on the trailer deck under icy conditions without risk of collisions, or scratches. An additional benefit of the pilot channels of this invention is that each sled is supported against lateral displacement across the surface of an ice-coated trailer deck, i.e., the machines will not slide together under sharp or high-speed turns of the vehicle.

BRIEF DESCRIPTION OF THE DRAWINGS

FIGS. 3a–3h. Sectional views of alternative unitary and multiple pilot-channel embodiments showing complimentary form to various known runner profiles, especially wear-resistant blade inserts.

DETAILED DESCRIPTION OF BEST-MODE EMBODIMENTS OF THE INVENTION

The basic function of pilot-channel arrays is to facilitate placement and transport of runner-supported vehicles or containers, expecially snowmobiles fitted with wear-resistant cutter blades or wear rods on the skis. The essential purpose is to support the machine or goods on smooth, low-friction pilot channels which do not contact the ends/edges of the wear-resistant elements, thus avoiding "digging in" damage to the deck which would otherwise occur.

Figure 1:
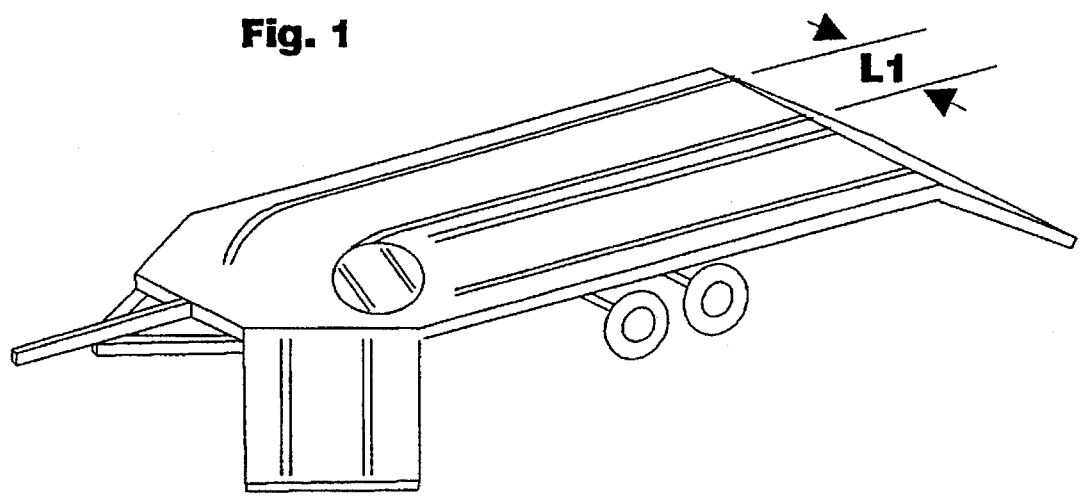
FIG. 1. Schematic isometric view of a snowmobile trailer and ramp fitted with pilot channels fixed to deck and ramps and showing a circular, pivotable, moveable segment with pilot channels.

FIG. 1 illustrates a typical large, non-tilting snowmobile trailer with tandem axles and shows a 3D array of pilot channels fixed to a rear "on-ramp", the main deck, and a front "off ramp". In this illustration, individual pilot-channels are shown in a spaced-apart layout, i.e., separated by the nominal average track of the runners, which is designated as L1. For the sake of convenience in this specification, all parameters of the pilot channels and pilot-channel arrays will be scaled or normalized by the characteristic L1 dimension. For example, many snowmobiles have an average ski-centerline spacing or track of about 1100 mm; if this characteristic dimension is denoted as L1, and the width of a typical runner is about 100 mm, the L1-scaled width of the runner is thus 100/1100 or 0.091, which is a non-dimensional runner-width parameter.

FIG. 1 depicts a trailer with an dual pilot-channel array consisting of two sets of pilot channels for transporting two sleds in a side-by-side configuration; from the observer's view point the closest sled is denoted as "near" and the most remote as "far". As can be seen in FIG. 1, a portion of the length of the pilot channels is fixed in an arc of radius about 2–20 times the separation of the runners; expressed in scaled terms, an arc of radius 2 to 20 L1. This fixed curved zone facilitates driving the sled runners from the main section onto the moveable circular section to facilitate drive-off unloading. A moveable circular baseplane zone is shown in FIG. 1. This zone contains 2 fixed parallel straight segments of pilot channel and is shown as a circle of diameter between 1.3 L1 and 2 L1. It is shown as having a center pivot pin and free rotation about that axis. The center pin is inserted into a prepared first receiver hole in the trailer deck to allow the zone to be rotated and placed in an orientation which blocks forward movement of the sled on the near-side. For unloading the near sled, the circular zone is rotated about 45 deg. clockwise (CW) from the position shown and moved into a second prepared receiver hole. This permits the near sled to be moved forward slowly under power with a steady turning moment applied to the handlebars. Under these combined forces, the moveable zone is progressively rotated to guide the sled off the front ramp of the trailer. For unloading the far sled there are two possible methods. The simplest is to leave the circular zone with its pivot pin in the first hole and rotate it so that one of its channels aligns with the inboard pilot channel for the far sled. As can be seen from FIG. 1, this will leave a short gap in the outboard channel; this gap is easily bridged by the runner as the far sled is moved slowly forward. This illustrates one possible layout for guidance of the sled along the "on-ramp" to the transport position and finally down and off the "off-ramp". In order to accommodate short-radius curves, the following factors must also be considered: length of runner, form of runner, size/placement of the wear-resistant blade, shape/size of pilot-channel, and local spacing distance L1. These same parameters must be considered when fixing the length and angles between adjacent straight segments as illustrated by the angle shown between the channels of the front "off-ramp" and the channels on the main deck. Transverse traction elements of any known form and pattern can be applied to the baseplane area between the pilot channels to assure maximum engagement of the drive track for controlled movement under power. For example short segments of the pilot channel formed material may be secured to ramps and/or the main deck surface FIGS. 2a–2f illustrate a few known profile shapes for runners or skis. Other known commercial runner shapes include vee-shapes, slabs, slats and numerous variants/combinations. The characteristic width of the runner is shown as L2. The characteristic size of the wear-resistant rod element is shown as L3. The characteristic depth of the recess in the runner working face is shown as L4, and the characteristic height dimension of a wear-resistant cutting-fin element is shown as L5.

Figure 2A:
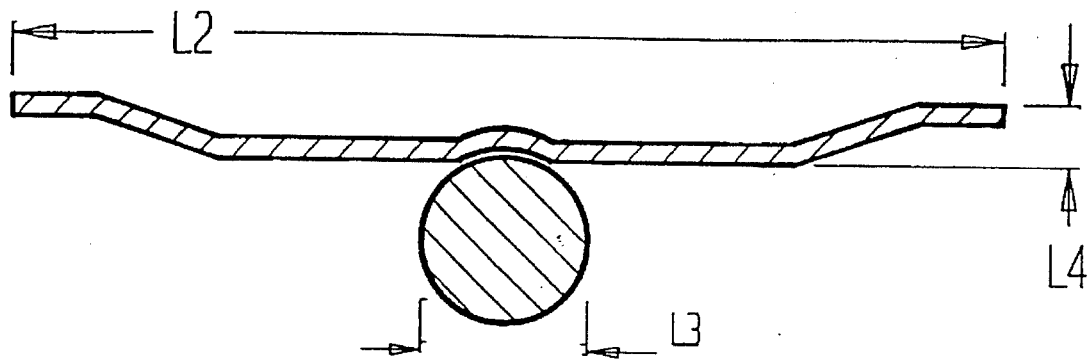
FIGS. 2a–2g. Sectional views of known runner or ski profiles showing replaceable and wear-resistant blade elements.
Figure 2B:
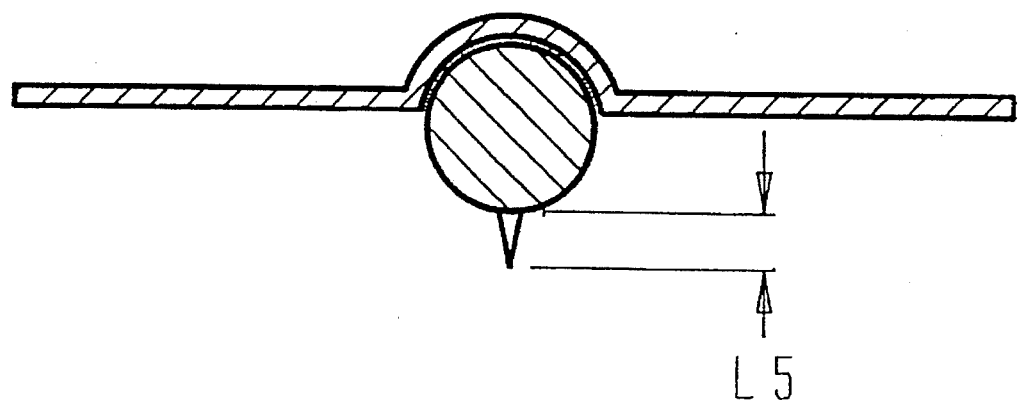
Figure 2C:
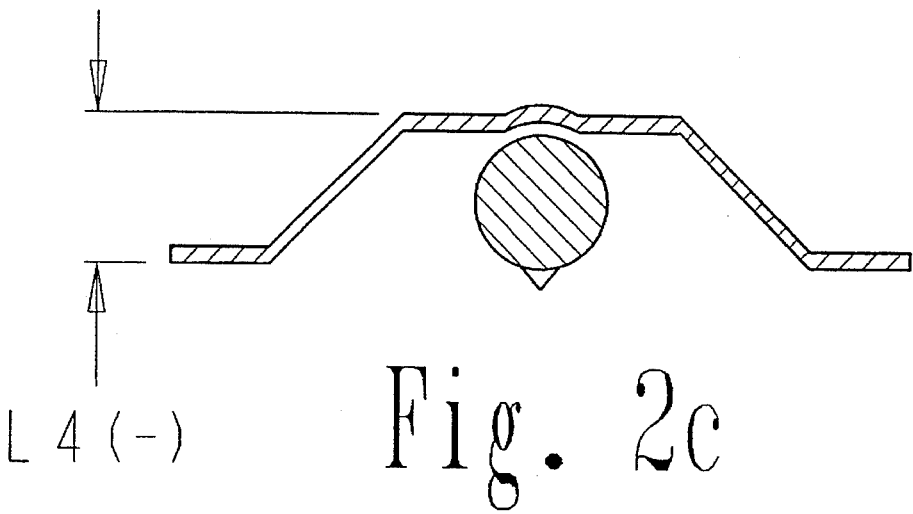
Figure 2F:
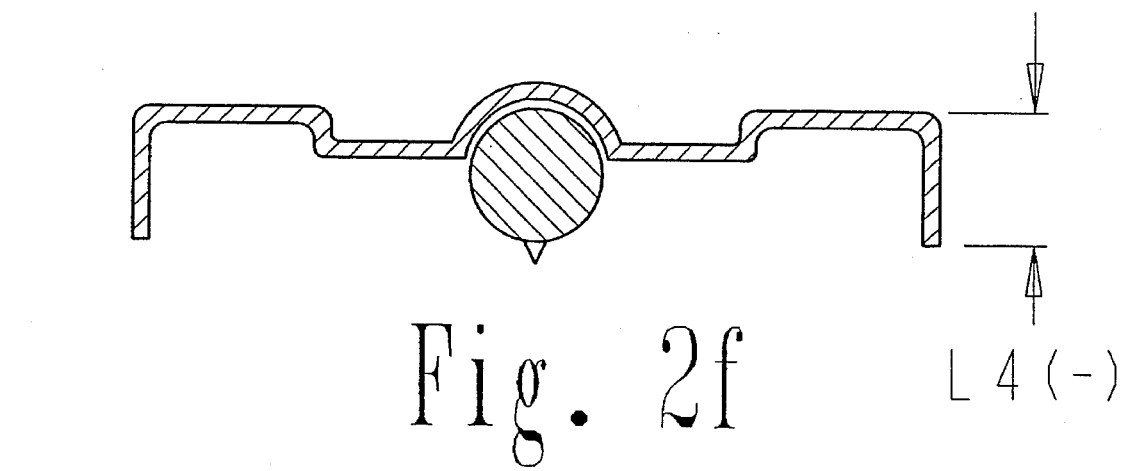
Figure 2E:
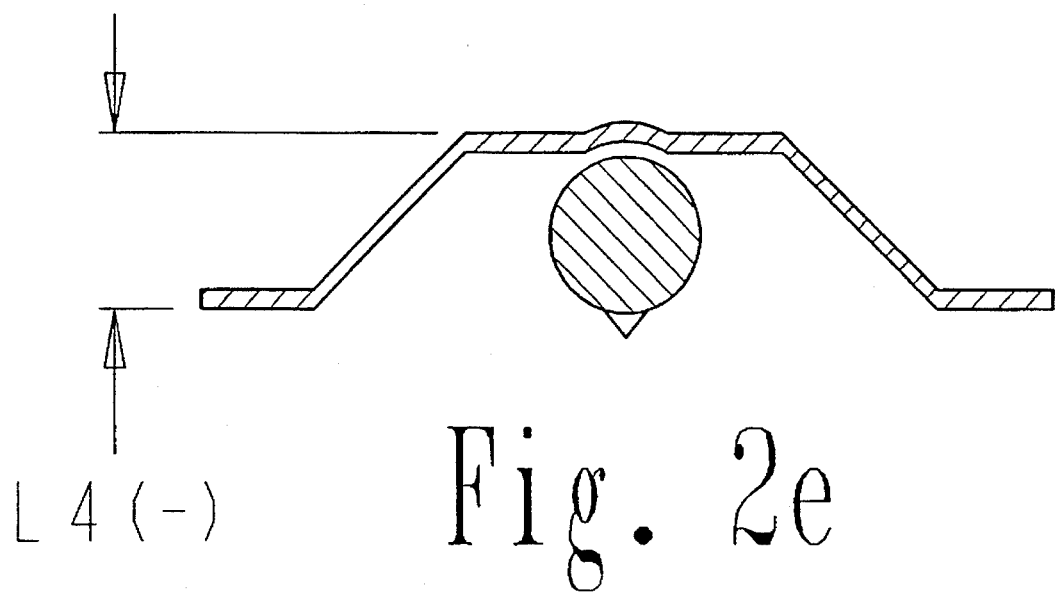
Figure 2D:
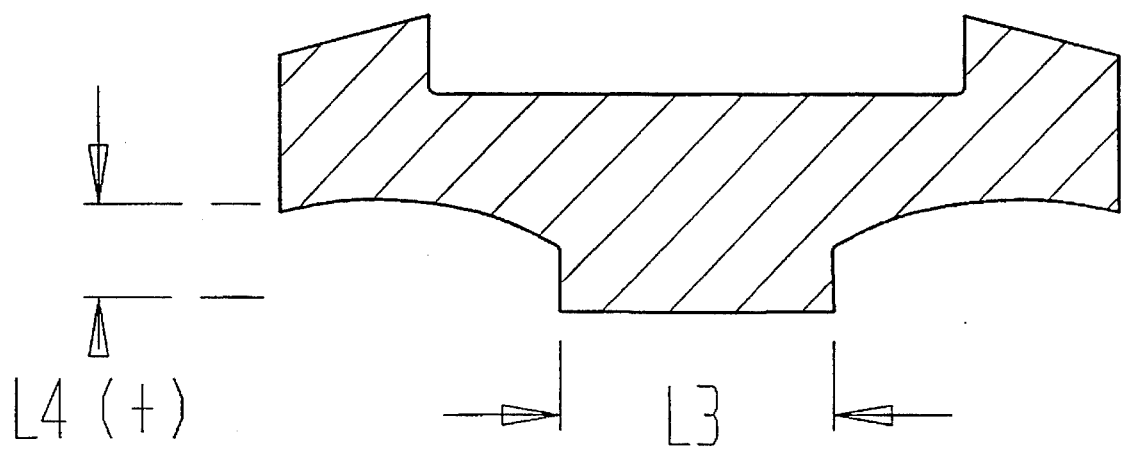
Figure 2G:
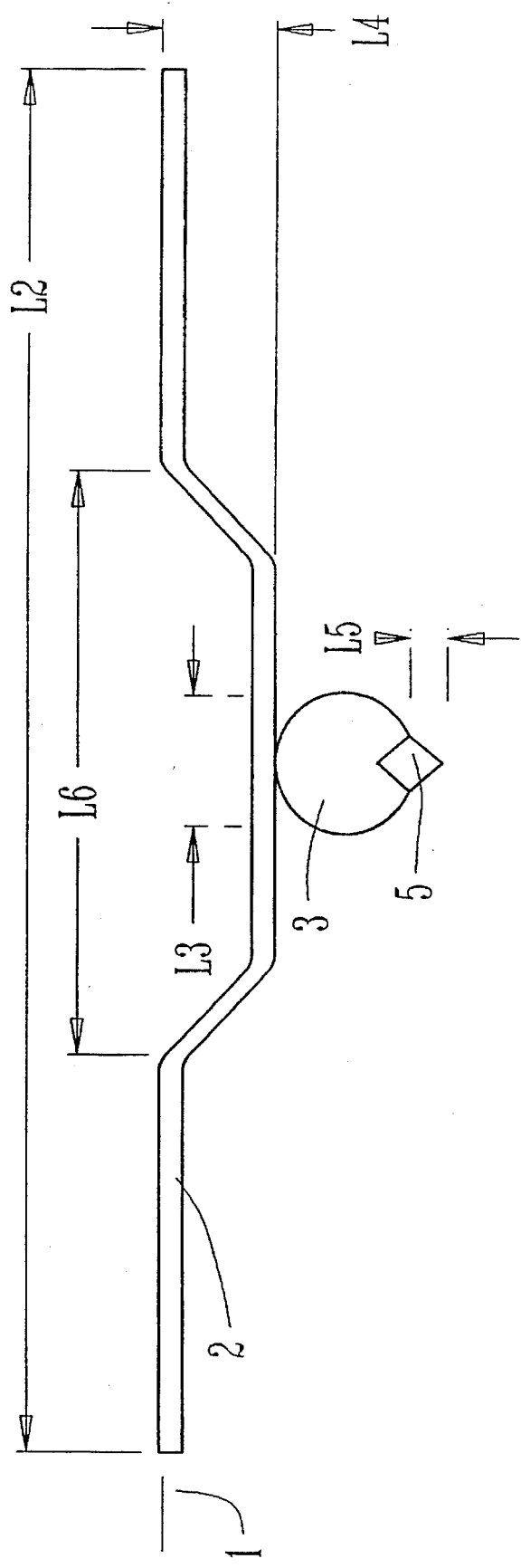

FIG. 2g depicts a typical cross-section of a snowmobile runner 2 with a replaceable wear rod 3 and a wear-resistant element 5, usually tungsten carbide, which is attached to the wear rod. In this configuration, the runner width is indicated by L2 and the convex vertical depth of the central portion is positive or downward from the top reference plane 1. The diamond-shaped carbide wear-resistant element 5 is frequently welded or brazed into a preformed vee-groove in the rod 3. L5 indicates the exposed portion of the wear-resistant element 5 below the bottom of the rod 3. This sharpened edge provides critical lateral stability for the snowmobile under sharp, flat turns at high speed. The width of the convex central portion, L6, is approximately 35% of L2, the overall width. For an average runner, L4 and L3 are approximately 10–15% of L2.

FIGS. 3a–3f illustrate embodiments of several alternative pilot-channel profile shapes for supporting and guiding known runner profiles as shown in FIGS. 2a1–2a6.

The pilot-channel upward-facing working surfaces are denoted generally as WS regions and specific individual features as F1, F2 and F3; these spaced-apart features engage the runner surfaces/edges and provide a recess to accommodate a variety of runner profiles and sizes/shapes of wear-resistant inserts. For a runnered vehicle, the outboard edges of the runners are those farthest from its longitudinal centerline; likewise the inboard edges are those which face toward the longitudinal centerline. These same concepts also apply to defining edge-specific pilot-channel zones, i.e., the top and bottom surfaces, relative to the baseplane, are referred to as the upper and lower facades, UF and LF; the inboard and outboard surfaces, relative to the runner centerline, CL, are referred to as inboard and outboard facades, IF and OF. The upper facade of the pilot channel includes the working regions WS. The lower facade, LF is in contact with and attached to the baseplane or alternatively to transverse members of the trailer frame. Pilot-channels of this invention have two important working features, inboard and outboard. For this specification, the outboard working feature is denoted F1 and the inboard feature as F2. These features may be assymetric in form from inboard to outboard; further, they may be planar, combinations of planes or complex curved surfaces. F3 is the prismatic connecting recess which lies between F1 and F2; F3 may be a complex curved plane or a combination of planes.

FIG. 3a shows an embodiment of this invention wherein a pilot channel is divided into two inverted-vee semi-channels mounted at a spacing L20. In this example, each runner is supported by a pair of parallel semi-channels. This alternative is of significant value when the pilot channel is being curved over an arc in either the 2D or 3D sense. Such semi-channels can be attached to the baseplane with fasteners recessed into the WS regions.

FIG. 3b shows an embodiment wherein an formed pilot channel shape includes the mounting flanges, MF, the specific working surface features, F1, F2, the general working surfaces, WS, and a central recess, F3 defined by two planes with an included angle A10, which falls in the range 50–150 deg. In this example, L12 is the depth of the lowest point of the recess below the level of working surfaces, WS. This figure defines the general meaning of outboard working surface feature, F1, the inboard working surface feature, F2, and the connecting prismatic recess feature F3. The basic meaning of the symbol WS is the entire working surface of the pilot channel. For a profile such as shown in FIG. 3b, the lateral extent of WS can be estimated by adding the lateral extents of the components, i.e., F1+F2+F3. In an example where L11–L12 is 5 mm and L10 is 65 mm, and A10 is 90 deg., the total extent of F3 amounts to approximately 78 mm. Thus the lateral extent of WS is approximately 5+5+78=88 mm.

For a profile similar to FIG. 2b3 with L11–L12=5 mm, L12=30, and L15=30 the extent of WS for each semi-channel varys according to its specific bar spacing, i.e., with L13, L15, or L16. For the central semi-channel with L15=20 mm, the extent of WS is F1+F2+F3=90 mm with F3=20+2(30)=80 mm and F1=F2=5 mm.

Figure 3C:
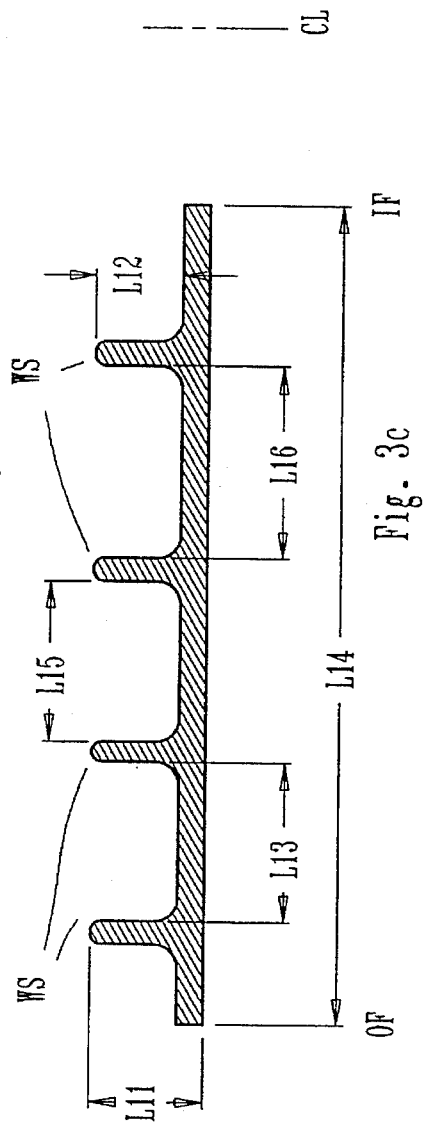

FIG. 3c shows a general multichannel embodiment wherein each pilot channel consists of a set of 2–10 spaced parallel bars with defined spacing distances, L13, L14 and L16 extending in a vertical plane upward from the mounting flange. In this case F3 recesses are U-channel surfaces of specific width which connect between and support the individual bars.

Figure 3F:
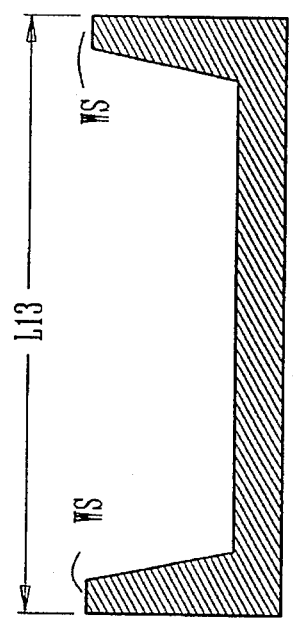

FIG. 3f shows a U-form unitary pilot channel for thick-wall straight sections. This shape is particularly rigid and can be used over thin baseplane materials. The spacing between working surfaces, L13, is comparable to L10 and L20.

Figure 3E:
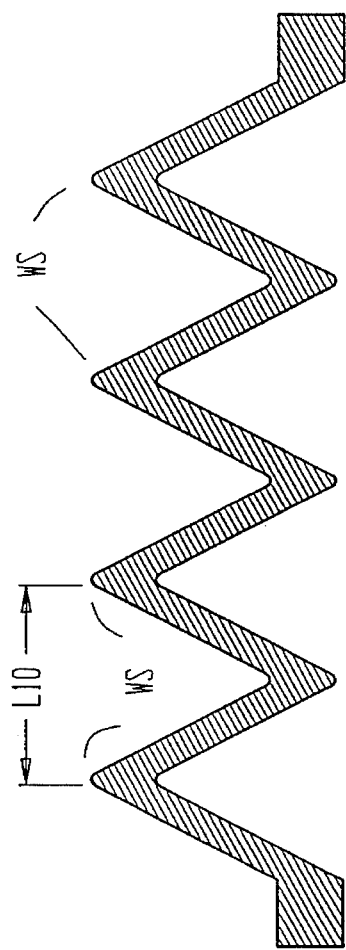

FIG. 3e shows a multiple pilot channel with a set of spaced apart vee-grooves analogous to the unitary example described in 2b2 and the multiple pilot channel shown in 3c.

Figure 3D:
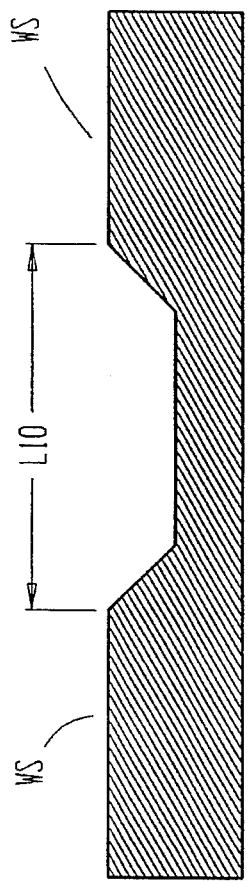

FIG. 3d shows a unitary pilot channel with two broad working surfaces WS, separated by a groove of width L10. This type of pilot channel should be mounted with recessed fasteners or adhesive.

Figure 3H:
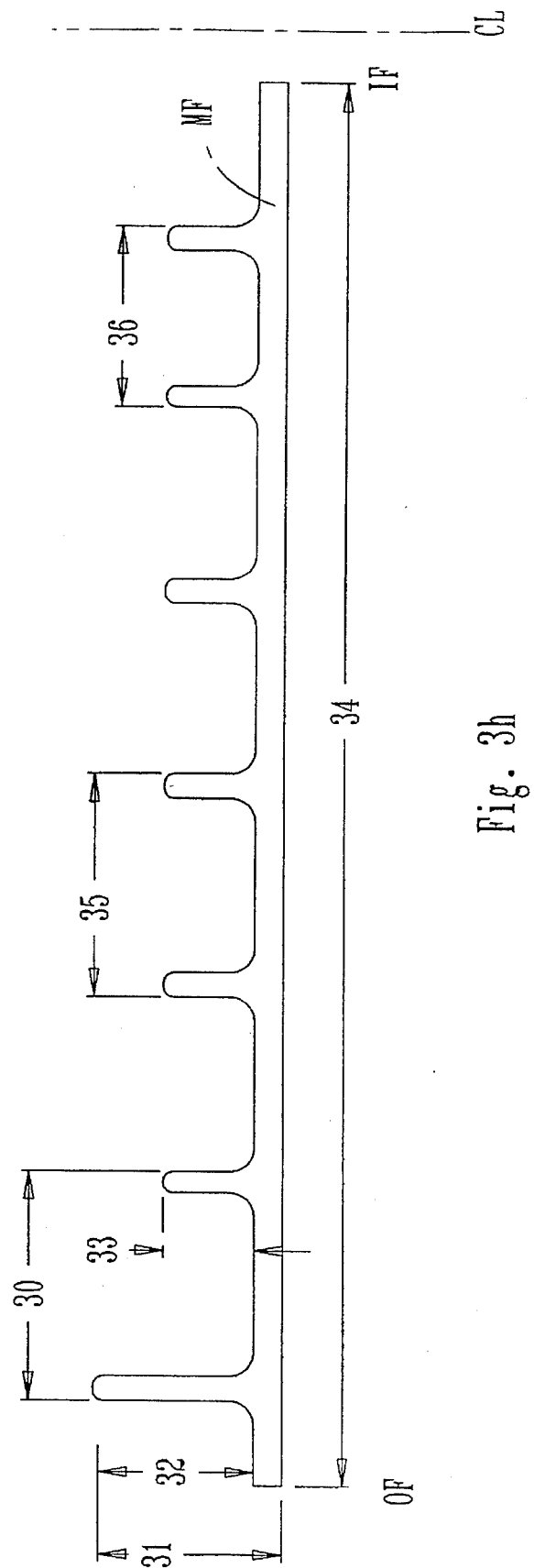
Figure 3G:
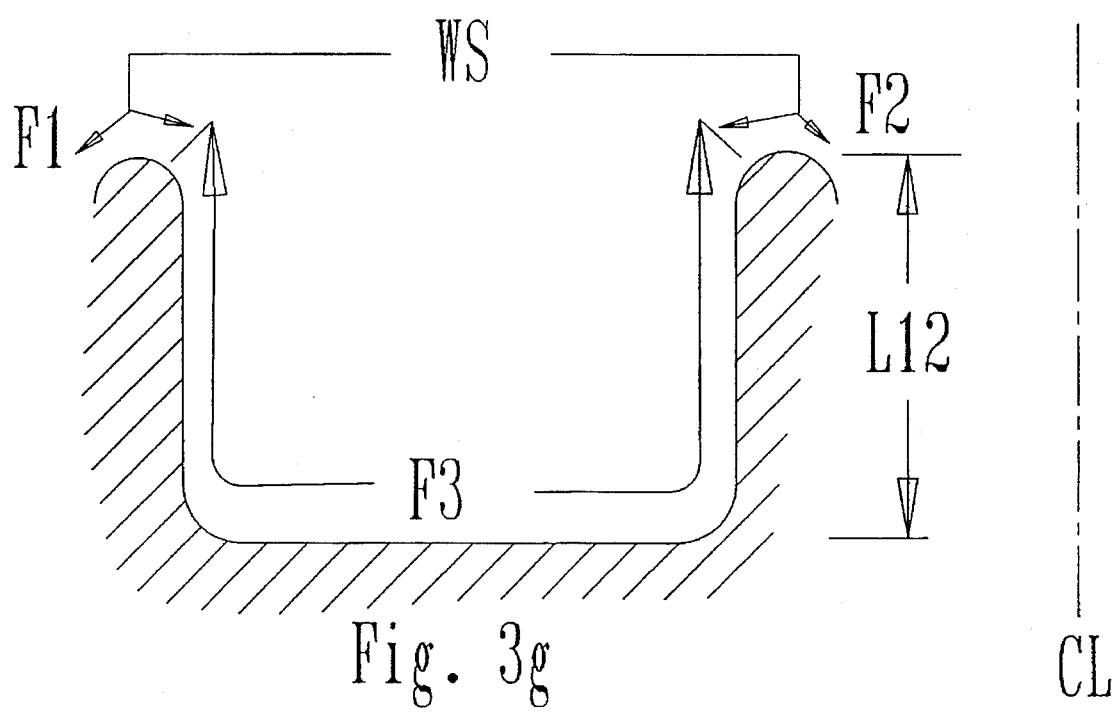

FIG. 3g further details the specific zones of a multiple pilot channel analogous to that shown in FIG. 3c. The terms inboard and outboard represent directions relative to the centerline CL for the snowmobile runners. The overall width, L14, of the multiple channel shown is approximately 2–10 times the F1/F2 spacing, L10, of a unitary channel embodiment as shown in FIG. 3b. In this multichannel embodiment, variable spacing of adjacent F1/F2 features is shown by three separate dimensions, L13, L15, and L16. This provision enables a multiple pilot channel profile to accomodate a variety of runner profiles and spacings as shown in FIGS. 2a–2g by adjustment, during mounting, of the lateral spacing between the multiple pilot channels, i.e., 2X the distance from the centerline, CL, to IF, the inboard facades. The three separate spacing dimensions, L13, L14 and L16 correspond approximately to three different values of L10 in a unitary pilot channel. As in FIG. 3g, F1 and F2 denote the outboard and inboard features of the general working surface, WS. As shown in FIG. 3g, the transitions between adjacent F1/F2 features and the prismatic connecting-recess feature, F3, are planes connected by arc fillets. In FIG. 3g, the recess feature is a U-shaped channel consisting of two parallel walls, each standing at an angle of approximately 90 degrees to the baseplane. The function of the transition fillets and the F3 feature is to provide lateral guidance to a positive, convex runner profile such as shown in FIG. 2g. This is exactly analogous to the inclined planes forming F3 as shown in FIG. 3b. The depth from the uppermost WS zone to the lowest point of F3 corresponds to L12 as was also shown in FIGS. 3b and 3c. The variable lateral spacings between neighboring working pairs of F1 and F2 features in the multiple pilot channel embodiment are shown as L13, L15, and L16; this differs from single L10 for the unitary channel as shown in FIG. 3b. In all embodiments the F3 recess is prismatic whether formed by two planes at an angle A10 as shown in FIG. 3b, or by three perpendicular planes as shown in FIG. 3c, or by three perpendicular planes with arc fillets as shown in FIG. 3g.

FIG. 3h shows a cross-section view of a multiple pilot channel with three different outside spacings 30, 35, and 36 between the bars which define the WS regions and at least two different bar heights above the mounting flange, MF. The function of this height difference is to provide a sturdy vertical barrier to prevent lateral overtravel of a runner which could mean costly damage due to a collision between sleds being loaded in a side-by-side arrangement. In this embodiment, the lateral spacing is depicted as a step function, i.e., the width of each channel is greater than its inboard neighbor by a geometric or logarithmic factor, starting with inboard spacing 36 as the initial value and moving in five steps up to spacing 30 at the outboard edge. In this embodiment the height of the extreme outboard bar above the mounting flange is shown as 32 and the height of the neighboring bar in the inboard direction is a smaller value, 33. This height difference, 32–33, is in the range 0.5–1.5 times the smallest rod height, 33. An alternative embodiment would be to step both the spacing and rod height in geometric or logarithmic progression of six steps starting from the smallest value at the inboard edge and the largest value at the outboard edge.

Figure 4C:
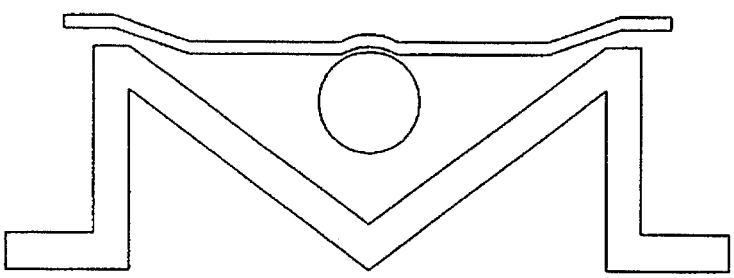
FIGS. 4a–4f. Sectional views illustrating engagement between runner profile and cross-sectional forms of unitary and multiple pilot channels.
Figure 4A:
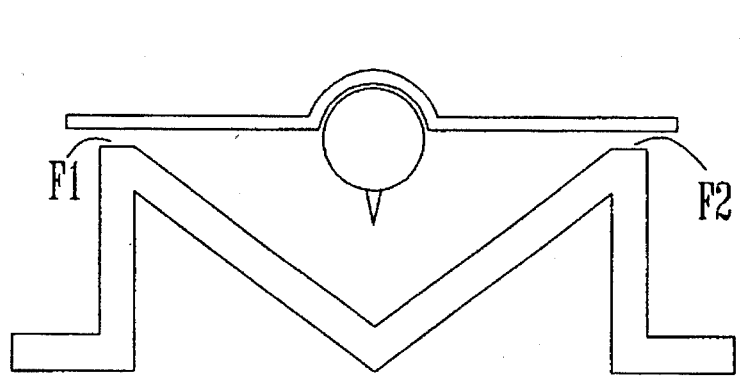
Figure 4B:
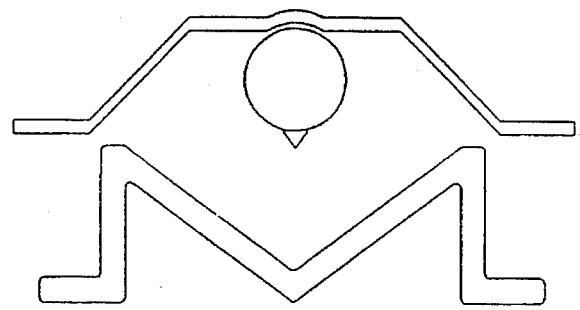

FIGS. 4a–c show schematic cross-sectional views of pilot channel-runner engagement between the F1 and F2 zones of the pilot channel working surface WS and the runner for a perfectly centered runner and pilot channel. FIG. 4(a) shows a typical flat runner profile from FIG. 2b with a finned wear rod engaged on a pilot channel profile from FIG. 3b. In this embodiment the sled is able to move laterally less than half the value of L10 before the rod contacts the F3 recess guide surface. FIG. 4b shows a typical concave runner with a negative L4 value. In this embodiment both outer edges of the F1 and F2 zones contact the sloping walls of the runner profile. This configuration results in minimal lateral movement. FIG. 4c shows a typical convex runner with a positive L4 value; the engagement of 3c also allows only minimal lateral movement.

Figure 4D:
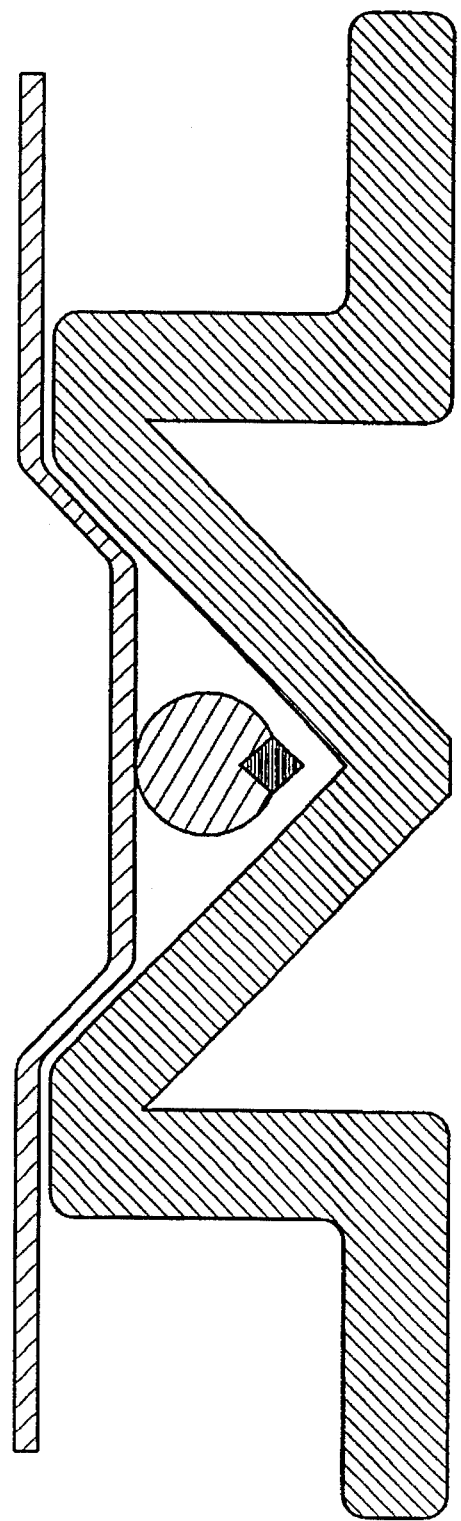

FIG. 4d shows a cross-section of the engagement of a typical runner such as shown in FIG. 2g, with the F1, F2 and F3 zones of a unitary pilot channel as shown in FIG. 3b. The inclined planes of the prismatic F3 recess feature provide low-friction lateral guidance for the runner and the upper F1 and F2 zones provide low-friction vertical support for the runner and front portion of the snowmobile positioned about the centerline, CL.

Figure 4E:
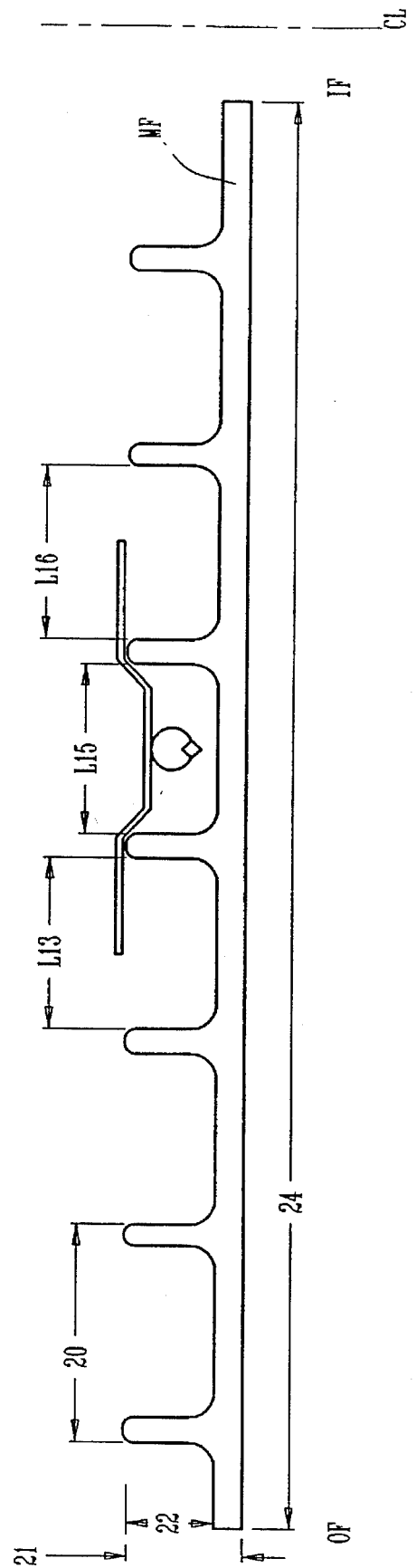

FIG. 4e shows a cross-section of the engagement of a runner as shown in FIG. 2g with a multiple pilot channel similar to the embodiment shown in FIG. 3c. In this embodiment, the height of all the vertical elements above the mounting flange, MF, is shown as 22; this corresponds to L12 of FIG. 3b or 3c. This embodiment is shown with 7 vertical bars which form 6 pilot channels with inboard and outboard mounting flanges, MF. Inside channel width is denoted as L13, L15, and L16 for 3 of the channels. The outside width of the outermost channel is denoted as 20. This value is greater than any inner width value and can exceed the largest of L13, L15, or L16 by an amount more than 50% of the largest of the three. In general, the wall thickness of the vertical elements is at least equal to the mounting-flange thickness; the maximum wall thickness of the vertical elements can be estimated by taking 0.5 (20-L16). The thickness of the mounting flange is given by the difference of 21–22. This value depands upon the type of lateral support provided by the baseplane across the width of the multiple pilot channel, 24. For a rigid wood deck baseplane at least 25 mm thick and a formed or extruded polyethylene multiple pilot channel, the MF value of 3–6 mm provides adequate strength for various types of threaded fasteners. For the case of multiple pilot channels attached directly to transverse structural members of the snowmobile trailer frame or to a flexible baseplane, provision should be made for a thicker MF value in the range 5–10 mm across the full width of each multiple pilot channel. Such a thick base also allows the use of separate metal longitudinal channel coupling strips to support adjacent pilot channels or the formation of integral mating-engagement features along both the longitudinal edges of the multiple pilot channels. Such integral mating engagement features include dowel pins, tongue and groove, half-thickness overlaps, etc. The overall width, 24, of a single formed multiple pilot channel can be in the range 120 to 500 mm.

Figure 4F:
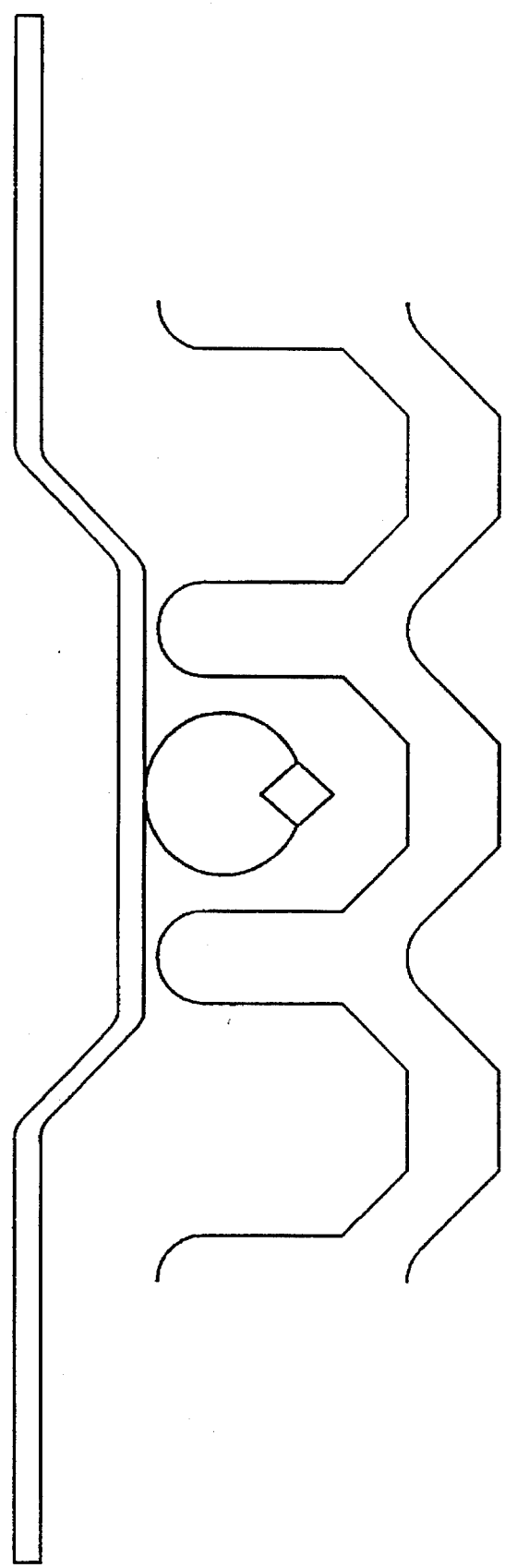

FIG. 4f shows engagement of a typical runner profile with a narrow-spaced, multiple pilot channel. In this embodiment the inside spacing L15 between adjacent F1 and F2 features is approx. 15% of the runner width or 2% of the runner track width. As already indicated, multiple pilot channel bands with such narrow-spaced features on the inboard edge and wider-spaced features on the outboard edge will permit many different combinations to accommodate different runner profiles and tracks.

Other embodiments of the Concepts of this invention include a trailer deck with one or more pairs of pilot-channels formed integral. It is envisioned that the deck could be made in one or more wide sections, each including a pair of pilot channels; each section would accommodate one runnered vehicle or runnered containers/pallets. Another embodiment would be to form a pattern of pilot channels on a one-piece trailer deck. For these concepts the forms shown in FIGS. 3c, 3h and 4e prepared with graded spacing patterns would be of significant value. Formed-integral pilot channel trailer-deck sections would be useful for movements of stacked containers in a route-delivery truck, such as a van for bakery products which are carried in molded plastic trays.

EXAMPLES

Table 1. presents a compact summary of definitions of each item of special nomenclature used to define pilot channels and pilot-channel arrays. Table 1 also presents dimensional data on runners and pilot channels including typical ranges of actual dimensions in millimeters or degrees and scaled by the track dimension, L1. The scaled values/ranges shown reflect a typical L1 value of 1100 mm.

Pilot-channels of this invention have been fabricated from a variety of polymer materials, plastic composites with filament reinforcement, plastic/metal laminations; loading trials under extremes of weather conditions have been used to validate the optimum materials, forms and fastening technics. One combination which has proved to be reliable is extruded polyolefin, using virgin or recycled pellets, in the general shape as shown in FIG. 3b, 3h, 4c or 4f fastened to a conventional plywood trailer deck with self-tapping screws.

This invention may be embodied in many other specific forms without departing from the spirit or essential characteristics thereof.

TABLE 1

DIMENSIONAL PARAMETERS OF PILOT-CHANNELS & ARRAYS

| Nomen-clature | Description | FIG. | Actual dimension mm or deg. min | Actual dimension mm or deg. max | L1-Scaled non-dimen min | L1-Scaled non-dimen max |
|---|---|---|---|---|---|---|
| RUNNER PARAMETERS | | | | | | |
| 1 | ref. plane, top surface runner profile | 2a7 | | | | |
| 2 | general runner profile | 2a7 | | | | |
| 3 | general replaceable wear rod | 2a7 | | | | |
| 5 | wear-resistant blade element, carbide | 2a7 | | | | |
| L1 | runner track and scaling basis | 1 | 300 | 1300 | 1.000 | 1.000 |
| L2 | width of ski | 2a1 | 90.00 | 145.00 | .082 | .132 |
| L3 | wear element, char. dimension | 2a1 | 11.00 | 16.00 | .010 | .015 |
| L4 | vertical depth, (+) convex or (−) concave | 2a3 | −45.00 | 45.00 | −.041 | .041 |
| L5 | ht. of wear-resist. element | 2a5 | .05 | 25.00 | .000 | .023 |
| L6 | outside width of convex runner zone | 2a7 | 50 | 100 | .045 | .091 |
| PILOT-CHANNEL PARAMETERS | | | | | | |
| CL | centerline of runners and pilot channels | 2b2 | | | | |
| LF | lower facade of pilot channel | 2b2 | | | | |
| UF | upper facade of pilot channel | 2b2 | | | | |
| OF | outboard facade of pilot channel | 2b2 | | | | |
| IF | inboard facade of pilot channel | 2b2 | | | | |
| WS | working surface length, pilot channel | 2b1 | 5.00 | 150.00 | .005 | .136 |
| F1 | working surface outboard feature extent | 2b2 | 3 | 60 | .003 | .055 |
| F2 | working surface inboard feature extent | 2b2 | 3 | 60 | .003 | .055 |
| F3 | connecting prismatic recess, F1–F2, extent | 2b2 | .01 | 100 | .000 | .091 |
| MF | mounting flange extension, pilot channel | 2b2 | .01 | 55.00 | .000 | .050 |
| L10 | outside width of pilot-channel facades | 2b2 | 20.00 | 200.00 | .018 | .182 |
| L11 | total ht. of pilot channel betw.UF,LF | 2b2 | 5.00 | 100.00 | .005 | .091 |
| L12 | inside depth of pilot channel, below WS | 2b2 | 1.00 | 75.00 | .001 | .068 |
| L13 | inside F1/F2 width spacing1* | 2b3 | 12.00 | 150.00 | .011 | .136 |
| L14 | overall width of pilot channel | 2b2 | 40.00 | 300.00 | .036 | .273 |
| L15 | inside F1/F2 width spacing2* | 2b3 | 12.00 | 150.00 | .011 | .136 |
| L16 | inside F1/F2 width spacing3* | 2b3 | 12.00 | 150.00 | .011 | .136 |
| A10 | recess included angle | 2b2 | 50.00 | 150.00 | .045 | .136 |
| L20 | width of separated semi-channels | 2b1 | 50.00 | 100.00 | .045 | .091 |
| 30 | outside width of outboard multiple channel | 2b8 | 30 | 100 | .027 | .091 |
| 31 | total height of outboard vertical element | 2b8 | 20 | 80 | .018 | .073 |
| 32 | ht. of outboard vertical element above MF | 2b8 | 15 | 90 | .014 | .082 |
| 33 | ht. of vertical element above MF | 2b8 | 15 | 50 | .014 | .045 |
| 34 | overall width of multiple pilot channel band | 2b8 | 140 | 2500 | .127 | 2.273 |
| 35 | outside width of mult.channel<30 | 2b8 | 29 | 99 | .026 | .090 |
| 36 | outside width of mult.channel<35 | 2b8 | 28 | 98 | .025 | .089 |

NOTE: *spacing1, spacing2, spacing3 all diff.

We claim:

1. An apparatus for accommodating powered vehicles, each said vehicle having a drive track and a pair of parallel elongated runners for steering, said apparatus comprising:

a wheel-supported platform including at least one pivotable ramp section for loading and unloading said vehicles, at least one pair of broad channel members fixed on said platform, each said channel member having a comb-shaped cross-section with an array of spaced-apart parallel, vertical rib elements, lateral midpoints of said broad channel members being spaced apart by a distance corresponding approximately to the spacing distance between the pair of elongated runners of said vehicle each said channel member including a full-width horizontal mounting flange portion for directly engaging said platform, and a plurality of parallel and laterally spaced vertical ribs positioned on said mounting flange portion and extending the length of the channel member, each said rib having a rounded upper working surface zone for directly engaging the elongated runners of the vehicles, a plurality of channels forming recess zones in between said vertical ribs, for accommodating wear rods protruding from the elongated runners of the vehicles.

2. An apparatus according to claim 1, wherein each of said channel members is made of polyolefin polymer material.

3. A method of forming a supporting and guiding surface on a deck and a ramp of an existing snowmobile trailer, for accommodating powered sleds, each equipped with a pair of parallel runners having hard-metal wear-rods, comprising the following steps:

providing at least one pair of broad channel members, each said channel member including a comb-shaped cross-section, a full-width horizontal mounting flange portion for directly engaging said platform or said ramp, a plurality of parallel and laterally spaced vertical ribs positioned on said mounting flange portion and extending the length of the channel member, each said rib having a rounded upper working surface zone for directly engaging the elongated runners of the powered sleds, and a plurality of channels forming recess zones in between said vertical ribs, for accommodating the wear rods of the elongated runners of the vehicles, mounting said at least one pair of broad channel members longitudinally on said deck and said ramp such that the lateral midpoints of said broad channel members are laterally spaced apart by a distance corresponding approximately to the spacing distance between the pair of elongated runners of said powered sled.

4. The method according to claim 3, further comprising the step of forming the channel members from polyolefin polymer material.

* * * * *